UNITED STATES PATENT OFFICE.

HENRY BLUMENBERG, JR., OF LOS ANGELES, CALIFORNIA, ASSIGNOR, BY DIRECT AND MESNE ASSIGNMENTS, TO CARROLL ALLEN, OF LOS ANGELES, CALIFORNIA.

PROCESS OF TREATING PHOSPHATE MATERIALS.

1,251,741.        Specification of Letters Patent.        Patented Jan. 1, 1918.

No Drawing.      Application filed June 7, 1917. Serial No. 173,422.

*To all whom it may concern:*

Be it known that I, HENRY BLUMENBERG, Jr., a citizen of the United States, residing at Los Angeles, in the county of Los Angeles and State of California, have invented new and useful Improvements in Processes of Treating Phosphate Materials, of which the following is a specification.

My invention relates to a process of making mono-calcium-phosphate, the so-called super-phosphate of commerce.

It is an object of this invention to treat phosphate rock ($Ca_3P_2O_8$) to convert the same into mono-calcium-phosphate.

The ordinary method of making mono-calcium-phosphate from phosphate rock employs sulfuric acid, which is expensive and destructive to the apparatus in which the process is carried on. Furthermore, since sulfuric acid acts not only on the calcium phosphate but also on the impurities which are carried in considerable quantities by the crude phosphate rock, such as iron oxids, calcium fluorids and aluminum silicates, the sulfuric acid method is restricted to the treatment of high-grade phosphate rock, the low grades of phosphate rock being too expensive to treat.

I have discovered a new process of converting phosphate rock without the use of sulfuric acid, by means of which not only high-grade phosphate rock but also the lower grades may be rapidly and economically treated to convert the same to mono-calcium-phosphate.

It is an object of this invention to treat phosphate rock in the production of mono-calcium-phosphate by means of sulfurous acid.

My invention consists in the combination of steps of my new process hereinafter described and claimed.

My process may be carried on in the following manner:

Phosphate rock ($Ca_3P_2O_8$), powdered to pass an 80 to 100 mesh screen, is mixed with water to make a magma averaging about 25% to 35% pulp, so that the same may be easily handled with centrifugal pump. The magma is then placed into a decomposing tank and sulfur-dioxid gas is forced therethrough, until the following chemical reaction is completed:

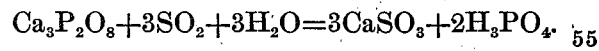

$$Ca_3P_2O_8 + 3SO_2 + 3H_2O = 3CaSO_3 + 2H_3PO_4.$$

The reaction should be carefully controlled, for if an excess of sulfur-dioxid is passed into the phosphatic magma beyond the absorption or neutralization point of the bases contained therein, the following reaction will occur:

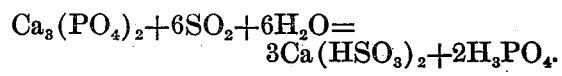

$$Ca_3(PO_4)_2 + 6SO_2 + 6H_2O = 3Ca(HSO_3)_2 + 2H_3PO_4.$$

This should not be allowed to occur for several reasons, namely: The bi-sulfite of calcium is toxic to plant life, and, being soluble, it would pass through the filter with the soluble phosphoric acid and destroy the filter cloths. However, when the reaction has been carried on to form calcium bi-sulfite, finely ground, untreated phosphate rock must be added until the calcium bi-sulfite is neutralized, so that the mixture will contain normal calcium sulfite and free phosphoric acid only. This mixture is pumped through a filter press and the calcium sulfite, being substantially insoluble, is retained in the press, and the soluble free phosphoric acid which may contain small quantities of sulfurous acid, is run off into a concentrating pan, concentrated to about 50% of phosphoric acid, and then mixed with an additional batch of finely ground phosphate material to form the super-phosphate of commerce, namely mono-calcium-phosphate. The chemical reaction is as follows:

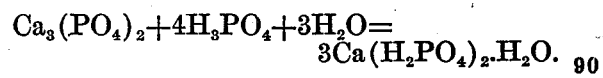

$$Ca_3(PO_4)_2 + 4H_3PO_4 + 3H_2O = 3Ca(H_2PO_4)_2 \cdot H_2O.$$

The mono-calcium-phosphate thus produced is then dried and ground to about 40 mesh screen and sacked.

It is thus seen that I have devised a new process of making super-phosphate without the use of sulfuric acid, and which is suitable for treating not only high-grade but also low-grade phosphate rock. The sulfurous acid shows a selective action and does not decompose impurities usually carried in phosphate rock, such as iron oxid, calcium fluorids and aluminum silicates, such undecomposed impurities being retained by the normal calcium sulfite in the filter press. The sulfurous acid decomposes the carbonates and phosphates in preference to the impurities just named.

While I contemplate the production of super-phosphate as the principal product, it is obvious from the description given above that the same process may be used for the production of free phosphoric acid, said acid being the intermediate product.

My process, while intended principally for the treatment of calcium phosphate rock, is not limited thereto, but may be used advantageously in the treatment of the phosphates of other alkaline earth metals or alkali metals.

While I have shown the preferred method of treating phosphate rock with sulfurous acid, as now known to me, it will be obvious to those skilled in the art that various changes in the steps in the process of my invention may be resorted to without departing from the spirit of my invention as claimed.

I claim:

A process of treating phosphate material, comprising subjecting ground tri-calcium phosphate to sulfur dioxid in the presence of water to form calcium sulfite and phosphoric acid, and separating said products.

In testimony whereof I have signed my name to this specification.

HENRY BLUMENBERG, Jr.